(12) United States Patent
DiSabatino (10) Patent No.: US 9,301,457 B2
(45) Date of Patent: Apr. 5, 2016

(54) DISK SAW FELLING HEAD WITH HYDRAULIC LINE ROUTING THROUGH HORN SECTION

(71) Applicant: DEERE & COMPANY, Moline, IL (US)

(72) Inventor: Benjamin DiSabatino, Brantford (CA)

(73) Assignee: Deere and Company, Moline, IL (US)

( * ) Notice: Subject to any disclaimer, the term of this patent is extended or adjusted under 35 U.S.C. 154(b) by 0 days.

(21) Appl. No.: 14/394,939

(22) PCT Filed: Oct. 26, 2012

(86) PCT No.: PCT/US2012/062068
§ 371 (c)(1),
(2) Date: Oct. 16, 2014

(87) PCT Pub. No.: WO2014/065810
PCT Pub. Date: May 1, 2014

(65) Prior Publication Data
US 2015/0122374 A1 May 7, 2015

(51) Int. Cl.
*A01G 23/081* (2006.01)

(52) U.S. Cl.
CPC ............................ *A01G 23/081* (2013.01)

(58) Field of Classification Search
CPC . A01G 23/081; A01G 23/083; A01G 23/085; A01G 23/087; A01G 23/091; A01G 23/093; A01G 23/095; A01G 23/097; A01G 23/099
See application file for complete search history.

(56) References Cited

U.S. PATENT DOCUMENTS

| 3,996,982 | A | | 12/1976 | Oldenburg |
| 4,727,916 | A | | 3/1988 | Sigouin |
| 5,129,438 | A | * | 7/1992 | Hamilton ..................... 144/343 |
| 5,503,201 | A | | 4/1996 | Strickland et al. |
| 6,640,850 | B1 | * | 11/2003 | Hicks ............................. 144/4.1 |
| 7,306,018 | B2 | * | 12/2007 | Hicks et al. .................. 144/336 |
| 2003/0205291 | A1 | | 11/2003 | Disabatino |
| 2007/0113925 | A1 | | 5/2007 | Disabatino |

OTHER PUBLICATIONS

"Written Opinion of the International Searching Authority" and "International Search Report"; Date of Mailing: Jan. 9, 2013; Number of pages: 6; Issued by: the United States Patent and Trademark Office.

(Continued)

*Primary Examiner* — Matthew G Katcoff
(74) *Attorney, Agent, or Firm* — Taft Stettinius & Hollister LLP; Stephen F. Rost (57) ABSTRACT

According to an aspect of the present disclosure, a disk saw felling head has a fore-aft dimension, a lateral dimension, and a vertical dimension such that the fore-aft dimension, the lateral dimension, and the vertical dimension are perpendicular to one another. The disk saw felling head comprises a frame comprising a first mounting post, a second mounting post, a motor housing, and a horn section, The first and second mounting posts are configured for attaching the disk saw felling head to a base machine and spaced laterally apart from one another relative to the lateral dimension and extending vertically relative to the vertical dimension. The horn section is mounted to a top portion of the first mounting post and a top portion of the second mounting post relative to the vertical dimension.

18 Claims, 8 Drawing Sheets

(56) References Cited

OTHER PUBLICATIONS

"International Preliminary Report on Patentability" Date of Issuance: Apr. 28, 2015; Number of Pages: 1; Issued by: The International Bureau of WIPO.

The International Search Report and the Written Opinion of the International Searching Authority, or the Declaration; Dated: Jan. 9, 2013; From: The International Searching Authority; pp. 1-9.

\* cited by examiner

DISK SAW FELLING HEAD WITH HYDRAULIC LINE ROUTING THROUGH HORN SECTION

This application is a U.S. national stage application under 35 U.S.C. §371 of PCT International Application Serial No. PCT/US2012/062068, which has an international filing date of Oct. 26, 2012, and designates the United States of America. The disclosure of this prior

FIELD OF THE DISCLOSURE

The present disclosure relates to a disk saw felling head. In particular, it relates to hydraulic line routing in a disk saw felling head. application is hereby expressly incorporated by reference in its entirety.

BACKGROUND OF THE DISCLOSURE

A forestry vehicle includes a base machine and a disk saw felling head attached to the base machine to be manipulated and controlled thereby. The disk saw felling head is configured to fell trees and to accumulate one or more of the or subsequent deposition.

The disk saw felling head has a disk saw. The disk saw is rotatable to fell a tree. In some cases, the disk saw felling head has a harvesting arm to gather a newly felled tree, and a bunching arm to hold the newly felled tree on the head. A harvesting cylinder pivots the harvesting arm, and a bunching cylinder pivots the bunching arm.

SUMMARY OF THE DISCLOSURE

According to an aspect of the present disclosure, a disk saw felling head has a fore-aft dimension, a lateral dimension, and a vertical dimension such that the fore-aft dimension, the lateral dimension, and the vertical dimension are perpendicular to one another. The disk saw felling head comprises a frame comprising a first mounting post, a second mounting post, a motor housing, and a horn section. The first and second mounting posts are configured for attaching the disk saw felling head to a base machine and spaced laterally apart from one another relative to the lateral dimension and extending vertically relative to the vertical dimension. The horn section is mounted to a top portion of the first mounting post and a top portion of the second mounting relative to the vertical dimension.

The disk saw felling head comprises a disk saw, a motor, a harvesting arm, a harvesting cylinder, a bunching arm, a bunching arm cylinder, and a hydraulic line. The motor is attached to the frame and the disk saw to rotate the disk saw relative to the frame. The motor is positioned within the motor housing. The harvesting arm is attached pivotally to the frame to pivot relative thereto to gather a felled tree. The harvesting cylinder is attached to the frame and the harvesting arm to pivot the harvesting arm relative to the frame. The bunching arm is attached pivotally to the frame to pivot relative thereto to hold the felled tree against the horn section. The bunching cylinder is attached to the frame and the bunching arm to pivot the bunching arm relative to the frame. The harvesting cylinder or the bunching cylinder is positioned above the motor housing relative to the vertical dimension. The hydraulic line is routed through an interior region of the first or second mounting post and an interior region of the horn section to the harvesting or bunching cylinder.

The above and other features will become apparent from the following description and the coupled drawings.

BRIEF DESCRIPTION OF THE DRAWINGS

The detailed description of the drawings refers to the accompanying figures in which.

DETAILED DESCRIPTION OF THE DRAWINGS

Figure 1:
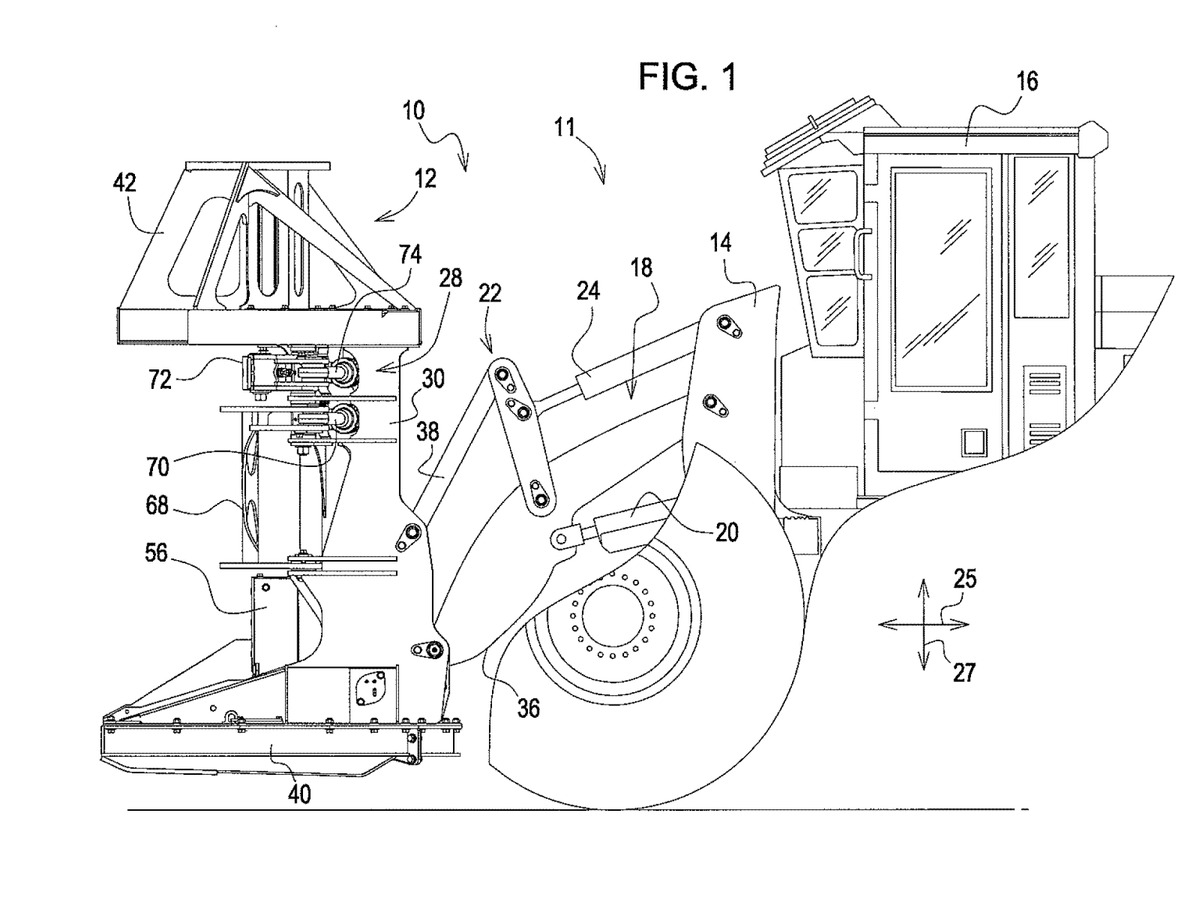
FIG. 1 is a side elevation view showing a simplified forestry vehicle including a base machine and a disk saw felling head attached to the base machine for manipulation thereby.

Referring to FIG. 1, there is shown a forestry vehicle 10 including a base machine 11 (e.g., wheeled base machine) and a disk saw felling head 12 attached to the base machine 11 to be manipulated and controlled thereby. The disk saw felling head 12 is configured to fell trees and to accumulate them for subsequent collective deposition.

The base machine 11 has a front frame 14, a rear frame, an operator's station 16, a boom 18, a pair of hydraulic lift cylinders 20 (left and right, the left shown and representative of the right), a pivot linkage 22, and a pair of hydraulic pivot cylinders 24 (left and right, the left shown and representative of the right). The front frame 14 and the rear frame are articulated to one another for relative pivotable movement therebetween about an articulation axis. The operators station 16 is mounted to the rear frame. The boom 18 is attached pivotally to the front frame 14, and the head 12 is attached pivotally to the boom 18. The lift cylinders 20 are attached to the front frame 14 and the boom 18 to raise and lower the boom 18, and thus the head 12, relative to the front frame 14. The pivot linkage 22 is attached pivotally to the boom 18 and the head 12. The pivot cylinders 24 are attached to the boom 18 and the linkage 22 to pivot the linkage 22, and thus the head 12, forwardly and rearwardly relative to the boom 18.

Figure 2:
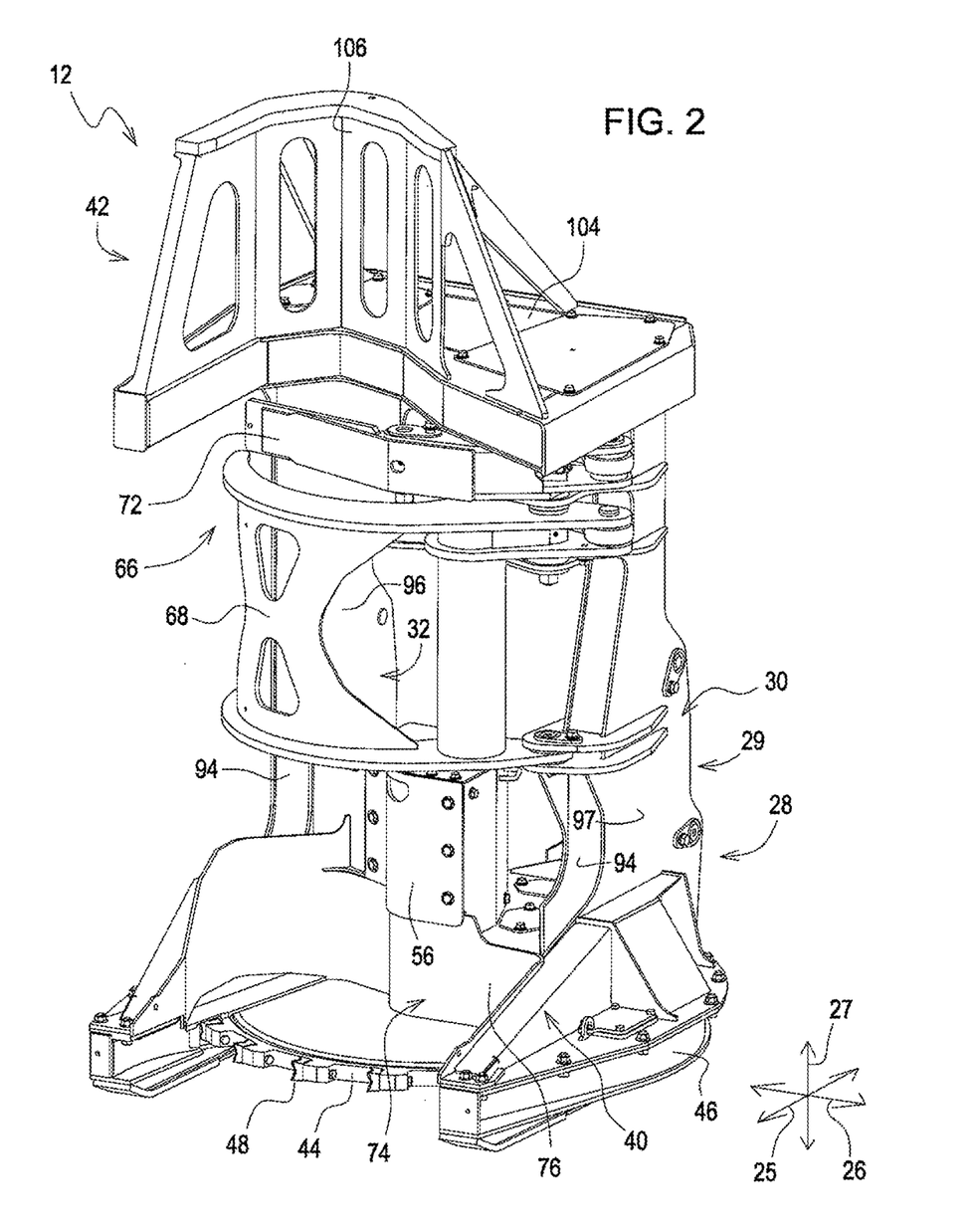
FIG. 2 is a perspective view of the disk saw felling head.
Figure 3:
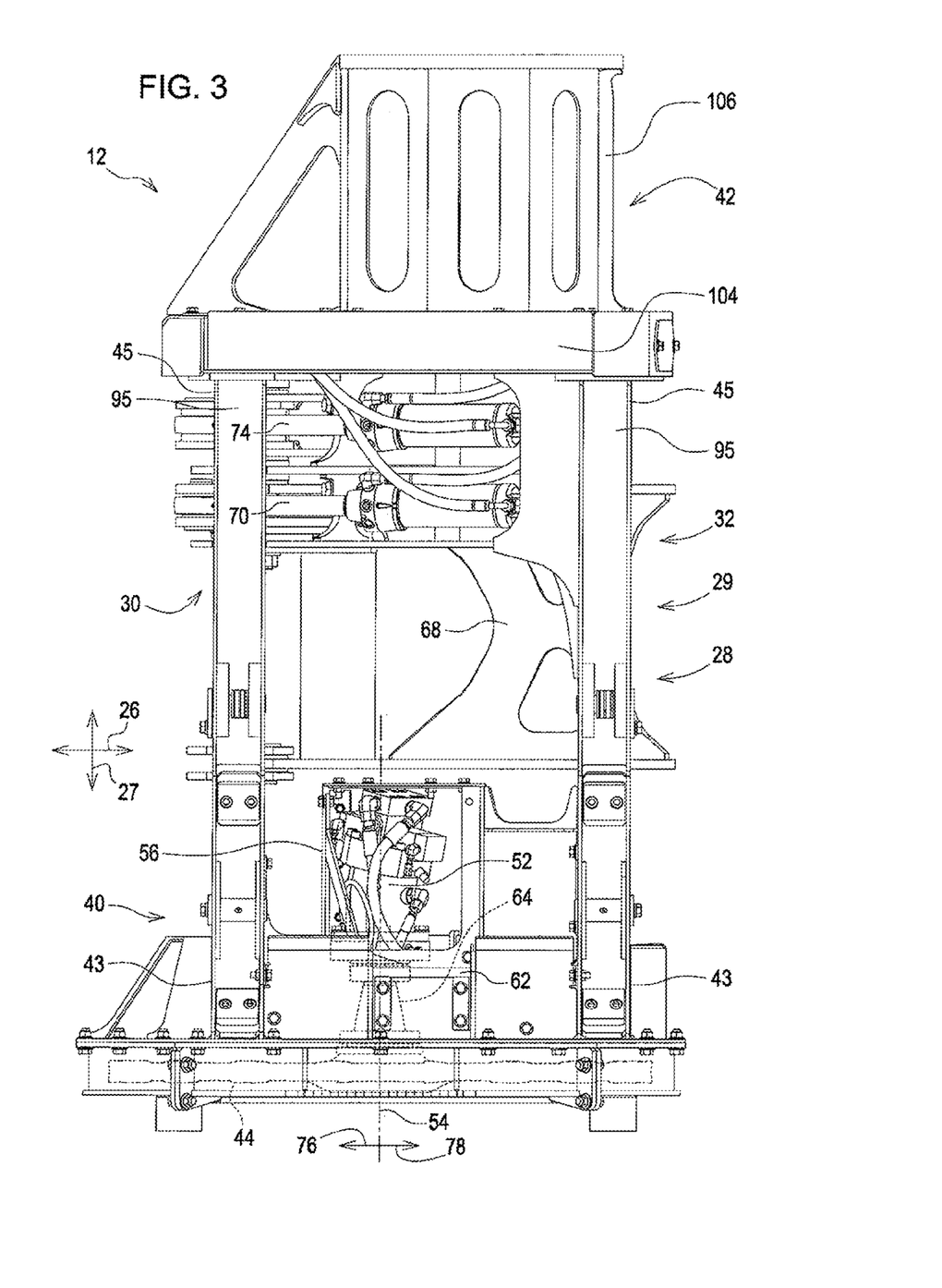
FIG. 3 is a rear view of the disk saw felling head.

Referring to FIGS. 1-3, the head 12 has a fore-aft dimension 25, a lateral dimension 26, and a vertical dimension 27. The fore-aft dimension 25, the lateral dimension 26, and the vertical dimension 27 are perpendicular to one another.

Referring to FIGS. 2 and 3, the head 12 includes a frame 28. The frame 28 includes a spine 29, which includes a left or first mounting post 30 and a right or second mounting post 32. The first and second mounting posts 30, 32 are configured for attaching the head 12 to the base machine 11 and are spaced laterally apart from one another relative to the lateral dimension 2$ of the head 12. The mounting posts 30, 32 extend along their length vertically relative to the vertical dimension 27.

Referring to FIG. 1, the boom 18 includes a left or first boom arm 36 and a right or second boom arm 36, the first boom arm 36 shown and representative of the second boom arm 36. The first boom arm 36 and the second boom arm 36 are attached pivotally to the front frame 14 and attached pivotally respectively to the first mounting post 30 and the second mounting post 32. The lift cylinders 20 are attached respectively to the boom arms 36.

The pivot linkage 22 includes a left or first link 38 and a right or second link 38, the first link 38 shown and representative of the second link 38. The first link 38 and the second link 38 are attached pivotally respectively to the first mounting post 30 and the second mounting post 32.

Referring to FIG. 3, the head 12 includes a saw-and-motor section 40 and a horn section 42. The saw-and-motor section 40 is attached (e.g., welded) to a bottom portion 43 of each mounting post 30, 32 relative to the vertical dimension 27. The horn section 42 is attached e.g., welded) to a top portion 45 of each mounting post 30, 32 above the bottom portion 43 relative to the vertical dimension 27.

Referring to FIG. 2, in the saw-and-motor section 40, the head 12 includes a disk saw 44 configured for felling trees. The disk saw 44 is attached rotatably to, and positioned largely within, a saw housing 46 of the frame 28 so as to be housed within the frame 28 and includes cutting teeth 48 spaced around its periphery for cutting through a tree. The disk saw 44 is partially exposed outside the saw housing 46 in a cutting zone at a front of the had 12 relative to the fore-aft dimension 25 for felling a tree.

Referring to FIG. 3, in the saw-and-motor section 40, the head 12 includes a hydraulic motor shown diagrammatically at 52. The motor 52 is mounted to the frame 28 and attached to the disk saw 44 to rotate the disk saw 44 relative to the frame 28 about a central axis 54 of the disk saw 44.

The frame 28 includes a motor housing 56 positioned laterally between the first and second mounting posts 30, 32 relative to the lateral dimension 26. The motor 52 is housed in the motor housing 56. The main body of the motor 52 is housed in an interior region of the motor housing 58, the main body configured for converting hydraulic fluid flow into rotary motion.

The frame 28 includes a hollow, generally box-shaped deck 62. The motor 52 is mounted to the deck 62. The motor housing 56 is mounted on top of the deck 62. The deck 62 includes an interior region in which a number of hydraulic lines of the head 12 extends. The deck 62 is positioned between the disk saw 44 and the motor housing 56 relative to the vertical dimension 27 and is mounted (e.g., welded) to the bottom portion 43 of each mounting post 30, 32.

The main body of the motor $2 is mounted atop the deck 69. The deck 62 includes an annular motor mounting block (not shown) that is attached (e.g., welded) to the top wall of the deck 62 in an aperture thereof. The main body is detachably fastened to the motor mounting block with threaded fasteners. The deck 62 includes a tube (not shown) extending from and attached (e.g., welded) to the motor mounting block and extending through and attached (e.g., welded) to the bottom wall of the deck 62. A first bearing (not shown) and a second bearing (not shown), each in the form of, for example, a tapered roller bearing, are mounted respectively within the motor mounting block and the tube.

A rotary output of the motor 52 is shown diagrammatically at 64. The rotary output 64 is configured, in the form of, for example, a forged mandrel, extends through the first and second bearings for rotation therein about the axis 54. The rotary output 64 is attached to the disk saw 44 by use of a flange that underlies the disk saw 54 and threaded fasteners extending through the flange and the disk saw 44 into the rotary output.

Referring to FIGS. 1-3, the head 12 includes an arm section 66 positioned between the saw-and-motor section 40 and the horn section 42 relative to the vertical dimension 27. In the arm section 66, the head 12 includes a harvesting arm 68, a harvesting cylinder 70, a bunching arm 72, and a bunching cylinder 74. The arms 68, 72 and the cylinders 70, 74 are positioned between the motor housing 56 and the horn section 42 relative to the vertical dimension 27.

The harvesting arm 58 is attached pivotally to the frame 28 to pivot relative thereto to gather a felled tree. The harvesting cylinder 70 is attached pivotally to the mounting post 32 of the frame 28 and the harvesting arm 68 and is operable to pivot the harvesting arm 68 relative to the frame 28.

The bunching arm 72 is attached pivotally to the frame 28 to pivot relative thereto to hold the felled tree against the horn section 42 and the rear pocket walls (in the form of, for example, plates), either directly against the horn section 42 and the rear pocket walls or indirectly via one or more other felled trees one or more of which is directly against the horn section 42 and the rear pocket walls. The bunching cylinder 74 is attached pivotally to the mounting post 32 of the frame 28 and the bunching arm 72 and is operable to pivot the bunching arm 72 relative to the frame 28.

Exemplarily, the harvesting and bunching arms 68, 72 are attached pivotally to the frame 28 on a first or left side 75 of the axis 54 relative to the lateral dimension 26, and the harvesting and bunching cylinders 70, 74 are attached pivotally to the mounting post 32 on a second or right side 78 of the axis 54 relative to the lateral dimension 26. The pocket is positioned on the second side 78 of the axis 54 relative to the lateral dimension 26. The harvesting and bunching cylinders 70, 74 are positioned above the motor housing 56 and below the horn section 42 relative to the vertical dimension 27.

During a felling event, operation of the harvesting arm 68 and the bunching arm 72 is coordinated in order to receive and accumulate felled trees. The harvesting arm 68 is opened in order to receive a tree onto a butt plate of the saw housing 46 upon felling. The harvesting arm 68 is closed to move the newly felled tree into a pocket on the second side 78 of the axis 54. Meanwhile, the bunching arm 72 is closed in order to hold any previously felled trees in the pocket. Once the harvesting arm 70 moves a newly felled tree over to the pocket, the bunching arm 72 is opened so as to move out and around the newly felled tree in order to hold the newly felled tree with any other felled tree(s) in the pocket. The bunching arm 72 is segmented into a first segment attached pivotally to the frame 28 and a second segment attached pivotally to the first segment and spring-biased to an open position relative to the first segment. Such segmentation facilitates bunching of the newly felled tree by the bunching arm 72.

Referring to FIGS. 4-9, the head 12 comprises a number of hydraulic lines for the harvesting and bunching cylinders 70, 74. For protection, at least one of those hydraulic lines is routed through an interior region of a mounting post 30 or 32 and an interior region of the horn section 42 to the harvesting cylinder 70 or the bunching cylinder 74.

The hydraulic lines for the cylinders 70, 74 comprise a first hydraulic line 80, a second hydraulic line 82, a third hydraulic line 84, and a fourth hydraulic line 86. The hydraulic lines 80, 82, 84, 86 start at external connector fittings attached to the rear wall of the deck 62 and are routed through an interior region of the deck 62. The first and third hydraulic lines 80, 84 are routed through the interior region of the deck 62, an interior region 88 of the first mounting post 30, and an interior region 90 of the horn section 42 respectively to the harvesting cylinder 70 and the bunching cylinder 74. The second and fourth hydraulic lines 82, 86 are routed through the interior region of the deck 62, an interior region 88 of the second mounting post 32, and the interior region 90 of the horn section. 42 respectively to the harvesting cylinder 70 and the bunching cylinder 74.

Each of the mounting posts 30, 32 is generally box-shaped so as to comprise a front wall 94, a rear wall 95, a laterally inner wall 96, and a laterally outer wall 97. The front wall 94 is positioned in front of the rear wall 95 relative to the fore aft dimension 25. and the laterally inner wall 96 is positioned laterally inward of the laterally outer wall 97 relative to the lateral dimension 26 with the axis 64 being the point of reference. The walls 94, 95, 96, 97 of the first mounting post 30 cooperate to provide the interior region 88 of the first mounting post 30, and the walls 94, 95, 96, 97 of the second mounting post 32 cooperate to provide the interior region 38 of the second mounting post 32.

Figure 4:
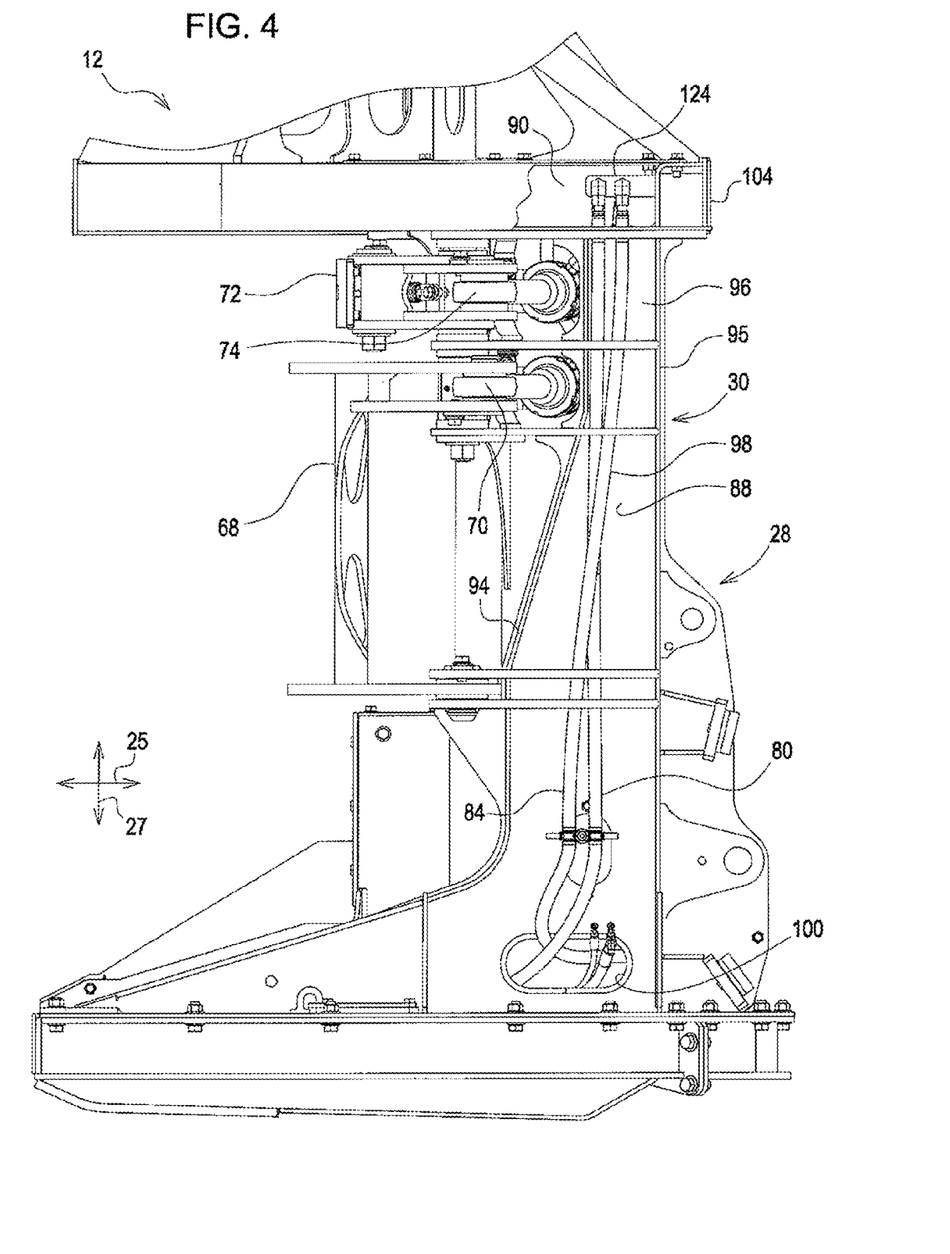
FIG. 4 is a left aide elevational view of the disk saw felling head, with portions broken away, showing routing of two hydraulic lines in a first mounting post.
Figure 5:
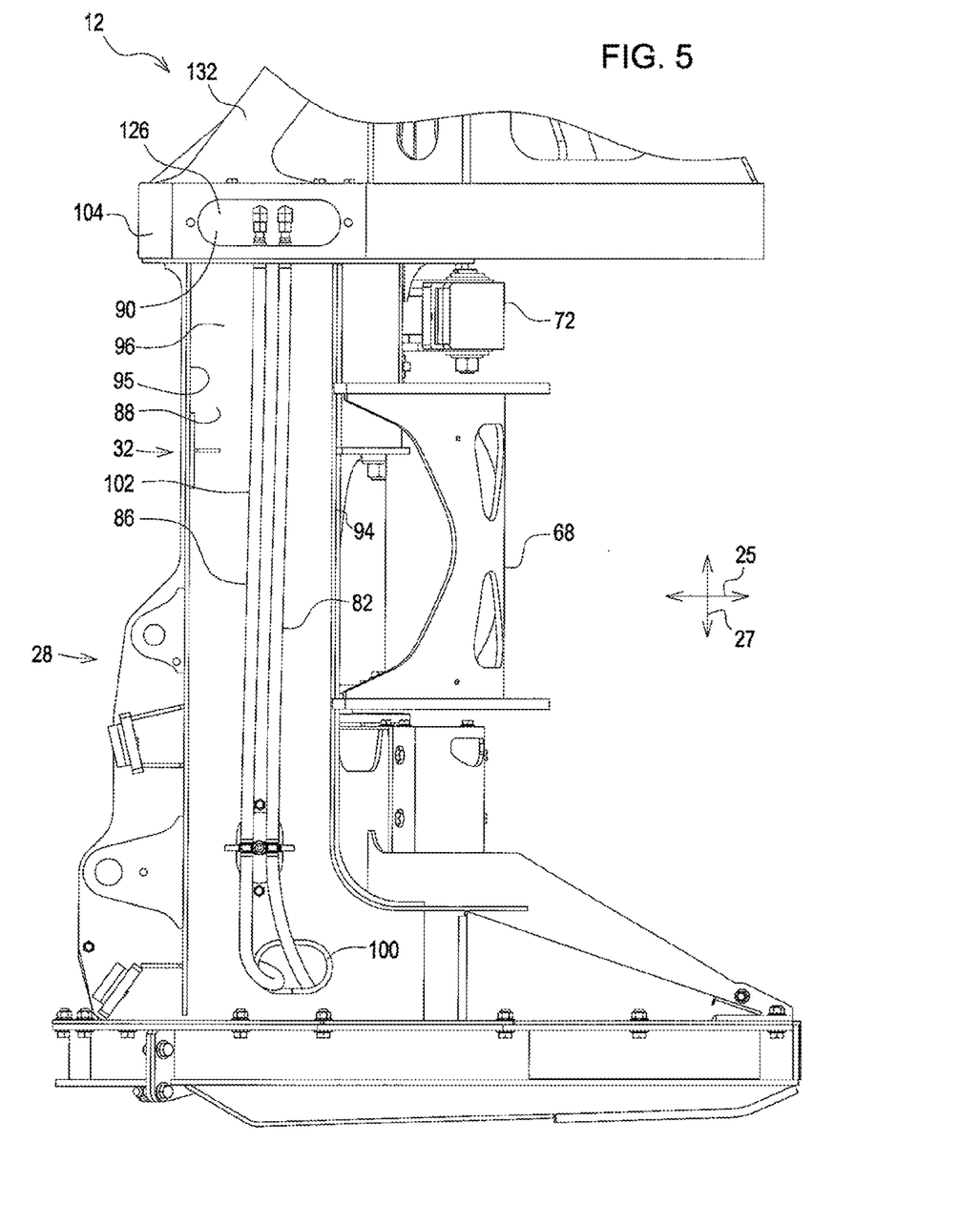
FIG. 5 is a right side elevational view of the disk saw felling head, with portions broken away, showing routing of two hydraulic lines in a second mounting post.

Each of the first and second mounting posts 30, 32 comprises a side aperture 100, as shown, for example, in FIGS. 4 and 5. The laterally inner wall 96 of the first mounting post 30 comprises the side aperture 100 of the first mounting post 30. The laterally inner wall 96 of the second mounting post 32 comprises the side aperture 100 of the second mounting post 32. Each side aperture 100 has a normal that is horizontal relative to the vertical dimension 27 and is oriented in the lateral dimension 26. A hose guide ring is included in each laterally inner wall 96 and is attached (e.g., welded) to the main plate of the wall 96 to provide the respective side aperture 100; each ring has a rounded cross-section to inhibit wear.

The horn section 42 comprises a housing 104 and a horn 106, as shown, for example, in FIGS. 3-7. The housing 106 is mounted to the top portion 45 of the first mounting post 30 atop the first mounting post 30 and the top portion 45 of the second mounting post 32 atop the second mounting post 32 relative to the vertical dimension 27. The horn 106 is mounted atop the housing 104 relative to the vertical dimension 27. The housing 104 comprises the interior region 90 of the horn section 42 through which each hydraulic line 80, 82, 84, 88 is routed. The housing is, for example, generally box-shaped and included in a platform of the horn section 42 on which the horn 106 is mounted.

Figure 6:
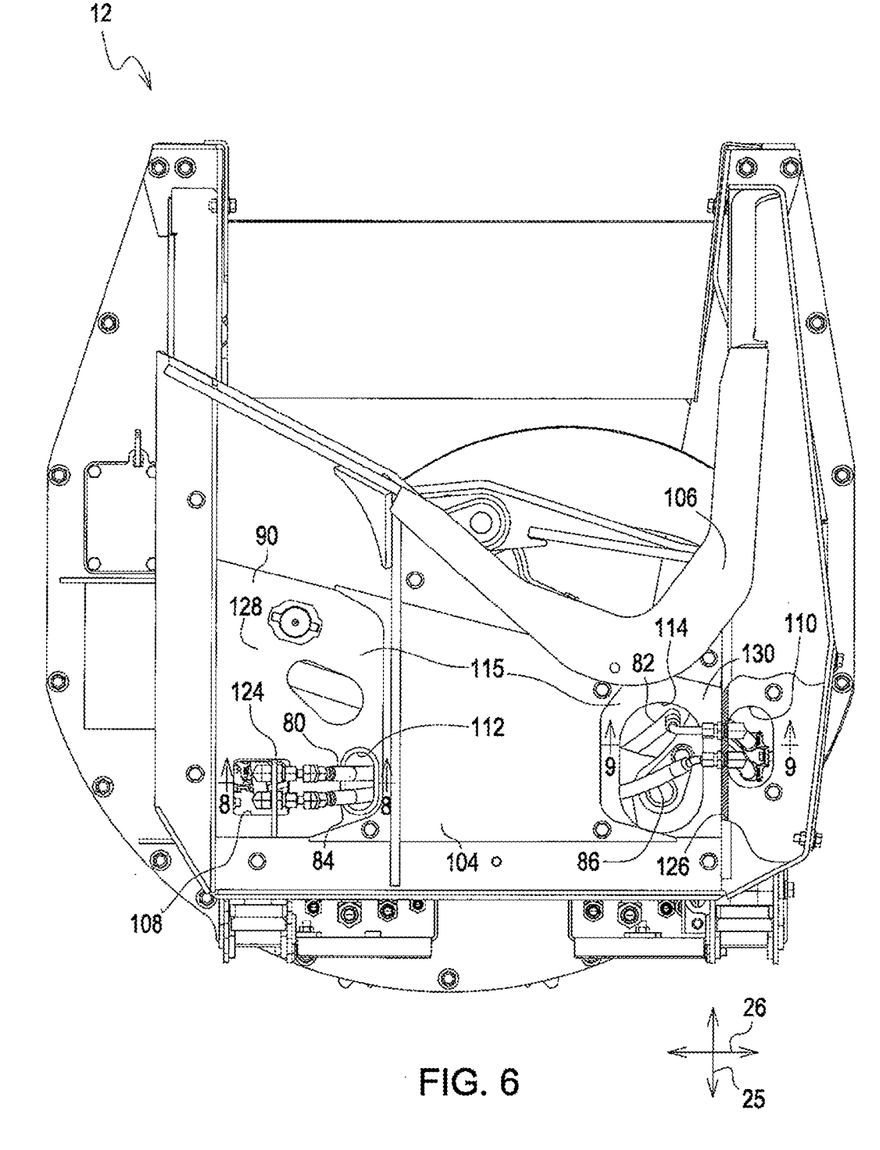
FIG. 6 is a top plan view of the disk saw failing head, with two access covers removed and a portion on the right side broken away, showing routing of the hydraulic lines through a horn section of the disk saw felling head.
Figure 8:
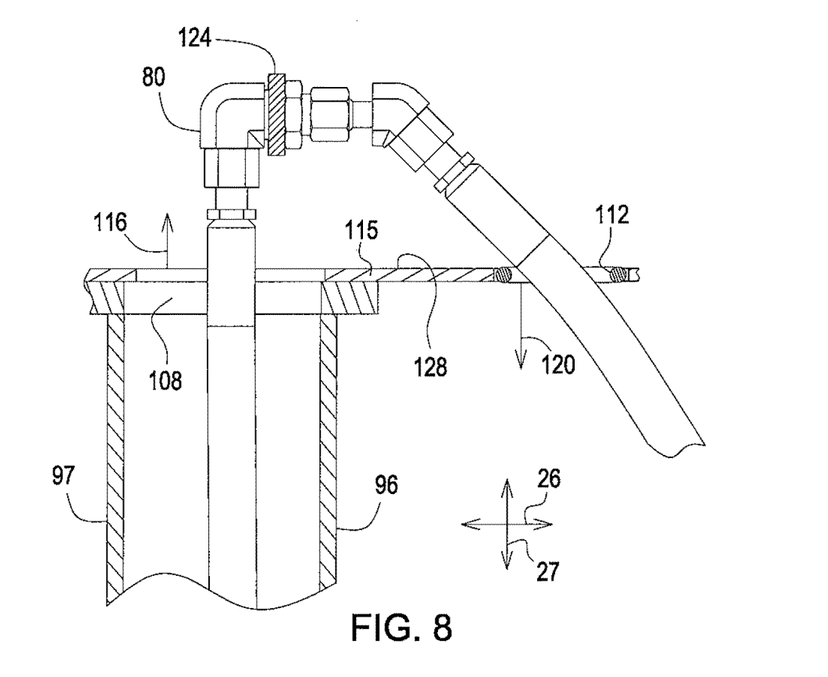
FIG. 8 is a sectional view taken along lines 8-8 of FIG. 6.

The first mounting post 30 and the housing 104 cooperate to provide a first aperture 108 between the interior region 88 of the first mounting post 30 and the interior region 90 of the housing 104, as shown, for example, in FIGS. 6 and 8. The second mounting post 32 and the housing 106 cooperate to provide a second aperture 110 between the interior region 88 of the second mounting post 32 and the interior region 90 of the housing 104, as shown, for example, in FIGS. 6 and 9.

Figure 7:
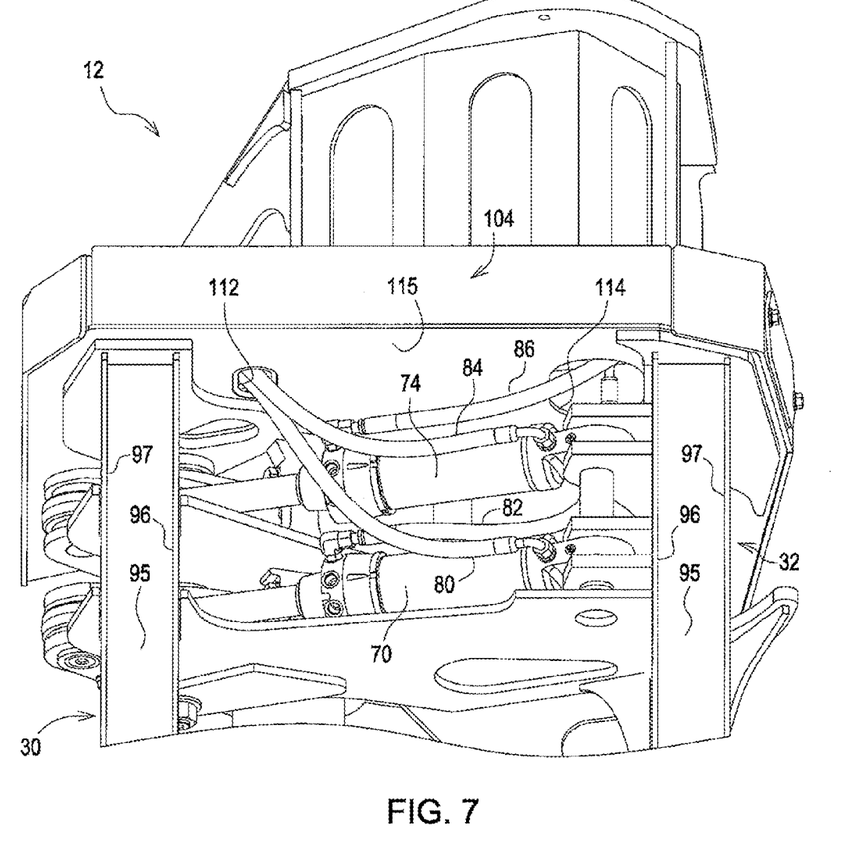
FIG. 7 is a rear perspective view of the disk saw felling head showing the hydraulic lines routed out of the horn section to either a harvesting cylinder or a bunching cylinder.
Figure 9:
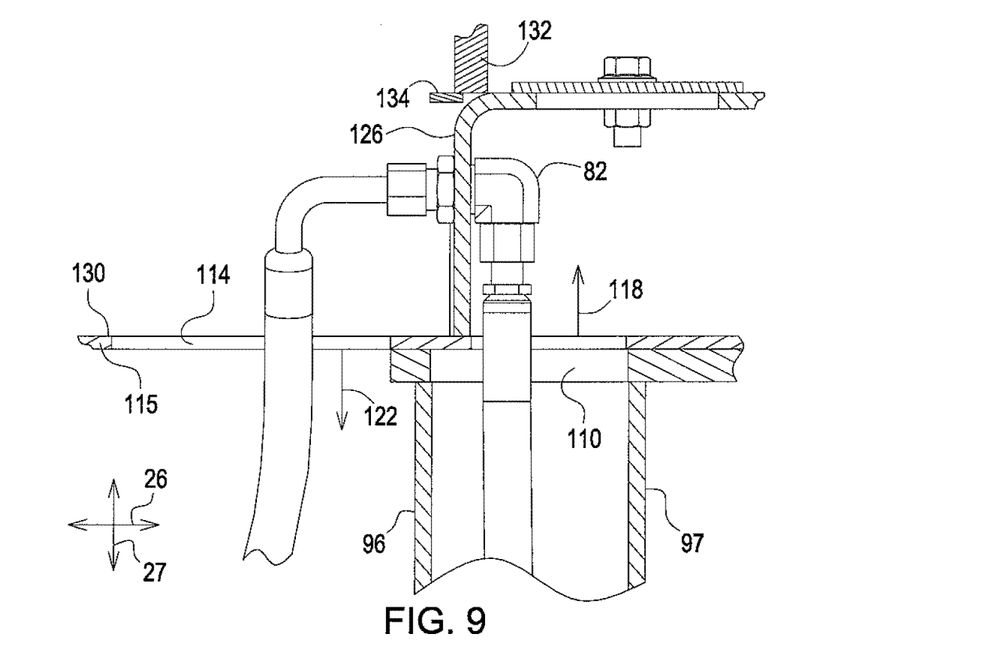
FIG. 9 is a sectional view taken along lines 9-9 of FIG. 6.

The housing 104 comprises a third aperture 112 and a fourth aperture 114, as shown, for example, in FIGS. 7-9. The third aperture 112 and the fourth aperture 114 are positioned laterally between the first and second mounting posts 30, 32 relative to the lateral dimension 26 and are positioned at an exterior of the horn section 42.

The housing 104 comprises an external wall 115 at a bottom of the housing 104 relative to the vertical dimension 27, as shown, for example, in FIGS. 7-9. The well 115 cooperates with the first and second mounting posts 30, 32 to provide, respectively, the first and second apertures 108, 110. The wall 115 comprises the third aperture 112 and the fourth aperture 114. The wall 115 is horizontal relative to the vertical dimension 27 such that a normal 116 to the first aperture 108, a normal 118 to the second aperture 110, a normal 120 to the third aperture 112, and a normal 122 to the fourth aperture 114 are vertical relative to the vertical dimension 27.

The wall 115 comprises a main plate, a first reinforcement plate, and a second reinforcement plate. The first and second reinforcement plates are attached (e.g., welded) to the underside of the main plate and respectively to the first and second mounting posts 30, 32. The first mounting post 30, the first reinforcement plate, and the main plate cooperate to provide the first aperture 108, and the second mounting post 32, the second reinforcement plate, and the main plate cooperate to provide the second aperture 110. A hose guide ring is included in the wall 115 and is attached (e.g., welded although not shown as such in FIG. 8) to the main plate to provide the third aperture 112; the ring has a rounded cross-section to inhibit wear. The main plate defines the fourth aperture 114.

The housing 104 comprises a first bulkhead 124 and a second bulkhead 126, as shown, for example, in FIGS. 6, 8, and 9. The bulkheads 124, 126 are positioned in the interior region 90 of the housing 104 such that they are protected from tree and limb impact damage. The first bulkhead 124 is positioned between the first aperture 108 and the third aperture 112 along a first routing path 98. The second bulkhead 126 is positioned between the second aperture 110 and the fourth aperture 114 along a second routing path 102. The first bulkhead 124 is configured, for example, as a plate attached (e.g., welded) to and cantilevered from a wall included in an angle bar of the housing 104. The second bulkhead 126 is configured, for example, as a wall included in an angle bar of the housing 104, the rounded corner of the angle bar cooperating with an elongated rectangular bar 134 (elongated in a direction perpendicular to the page of HG. 9) to provide footing for an access cover (i.e., the "second access cover" mentioned in the following paragraph), with a brace 132 of the horn 106, the angle bar, and the plate 134 welded to one another.

The interior region 90 of the housing 104 comprises a first compartment 128 and a second compartment 130, as shown, for example, in FIG. 6. The first compartment 128 comprises the third aperture 112. The second compartment 130 comprises the fourth aperture 114. A wall at the top of the housing 104 relative to the vertical dimension 27 comprises a first access cover that partially defines the first compartment 128 and a second access cover that partially defines the second compartment 130. Those access covers are shown in FIG. 2 but removed in FIG. 6.

The first and third lines 80, 84 are routed along the first routing path 98 within the first mounting post 30 and the horn section 42, as shown, for example, in FIGS. 4 and 6. In so doing, the first and third lines 80, 84 pass through the side aperture 100 of the first mounting post 30 into the interior region 88 of the first mounting post 30, and are routed vertically through the interior region 88 of the first mounting post 30 (and may crisscross in the interior region 58) and are routed through the first aperture 108, the first bulkhead 124, the first compartment 128, and the third aperture 112. The first line 80 is routed to the harvesting cylinder 70, and the third line 84 is routed to the bunching cylinder 74.

The second and fourth lines 82, 86 are routed along the second routing path 102 within the second mounting post 32 and the horn section 42, as shown, for example, in FIGS. 5 and 6. In so doing, the second and fourth lines 82, 86 pass through the side aperture 100 of the second mounting post 32 into the Interior region 88 of the first mounting post 32, and are routed vertically through the interior region 88 of the second mounting post 32 and are routed through the second aperture 110, the first bulkhead 124, the second compartment 130, and the fourth aperture 114. The second line 82 is routed to the harvesting cylinder 70, and the fourth line 82 is routed to the bunching cylinder 74.

The lines 80, 82, 84, 86 are thus routed in an efficient and clean manner. They are routed vertically lengthwise through the mounting posts 30, 32, avoiding sharp turns through apertures in the mounting posts 30, 32 at the upper ends of the routing paths so as to promote ease of assembly. Since the third and fourth apertures 112, 114 are included in the horn section 42, they are not included in the inner walls 96 of the mounting posts 30, 32 and thus do not weaken them. The normals 116, 118, 120, 122 are vertical relative to the vertical dimension 27 such that the lines 80, 82, 84, 86 exit the housing 104 in a downward direction, making it difficult for debris to enter the frame through the apertures 108, 110, 112, 114. The bulkheads 124, 126 anchor the lines 80, 82, 84, 86 so as to prevent them from moving and pulling along their respective axes.

Each line 80, 82, 84, 86 comprises a hose between the respective external connector fitting at the rear wall of the deck 62 and the respective bulkhead 124, 126, a hose between the respective bulkhead 124 126 and the respective cylinder 70, 74, and various fittings.

The welds and the fastener threads have not been shown in the drawings for simplification of illustration, it being understood that it would be well within the skill of one of ordinary skill in the art to provide those features without undue experimentation.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the appended claims.

What is claimed is:

1. A disk saw felling head, the disk saw felling head having a fore-aft dimension, a lateral dimension, and a vertical dimension such that the fore-aft dimension, the lateral dimension, and the vertical dimension are perpendicular to one another, the disk saw felling head comprising
a frame comprising a first mounting post, a second mounting post, a motor housing, and a horn section, the first and second mounting posts configured for attaching the disk saw felling head to a base machine and spaced laterally apart from one another relative to the lateral dimension and extending vertically relative to the vertical dimension, the horn section mounted to a top portion of the first mounting post and a top portion of the second mounting post relative to the vertical dimension, a disk saw,
a motor attached to the frame and the disk saw to rotate the disk saw relative to the frame, the motor positioned within the motor housing,
a harvesting arm attached pivotally to the frame to pivot relative thereto to gather a felled tree,
a harvesting cylinder attached to the frame and the harvesting arm to pivot the harvesting arm relative to the frame,
a bunching arm attached pivotally to the frame to pivot relative thereto to hold the felled tree against the horn section, and
a bunching cylinder attached to the frame and the bunching arm to pivot the bunching man relative to the frame, the harvesting cylinder or the bunching cylinder positioned above the motor housing relative to the vertical dimension,
a hydraulic line routed through an interior region of the first mounting post into an interior region of the horn section and out of the interior region of the horn section to the harvesting or bunching cylinder, and
wherein the horn section comprises a housing and a horn, the housing is mounted to the top portion of the first mounting post and the top portion of the second mounting post relative to the vertical dimension, and the horn is mounted atop the housing relative to tile vertical dimension, and the housing comprises the interior region of the horn section through which the hydraulic line is routed, and
wherein the first mounting post and the housing cooperate to provide a first aperture between the interior region of the first mounting post and the interior region of the housing, the housing comprises an external wall at a bottom of the housing relative to the vertical dimension, the external wall comprises a second aperture positioned between the first and second mounting posts, and the hydraulic line is routed from the first aperture into the interior region of the housing, through the interior region of the housing, and out of the second aperture to the harvesting or bunching cylinder.

2. The disk saw felling head of claim 1, wherein the first mounting post and the housing cooperate to provide a first aperture between the interior region of the first mounting post and the interior region of the housing, the housing comprises an external wall at a bottom of the housing relative to the vertical dimension, the external wall comprises a second aperture positioned laterally between the first and second mounting posts relative to the lateral dimension, and the hydraulic line is routed through the first and second apertures.

3. The disk saw felling head of claim 2, wherein a normal to the first aperture is vertical relative to the vertical dimension, a normal to the second aperture is vertical relative to the vertical dimension, and the housing comprises a bulkhead through which the hydraulic line extends horizontally relative to the vertical dimension.

4. The disk saw felling head of claim 1, wherein the horn section comprises an external wall, the external wall comprises an aperture positioned laterally between the first and second mounting posts relative to the lateral dimension and through which the hydraulic line is routed out of the horn section.

5. The disk saw felling wherein the horn section comprises a bulkhead through which the hydraulic line is routed.

6. A disk saw felling head, the disk saw felling head having a fore-aft dimension, a lateral dimension, and a vertical dimension such that the fore-aft dimension, the lateral dimension, and the vertical dimension are perpendicular to one another, the disk saw felling head comprising
a frame comprising a first mounting post, a second mounting post, a motor housing, and a horn section, the first and second mounting posts configured for attaching the disk saw felling head to a base machine and spaced laterally apart from one another relative to the lateral dimension and extending vertically relative to the vertical dimension, the horn section mounted to a top portion of the first mounting post and a top portion of the second mounting post relative to the vertical dimension, a disk saw, a motor attached to the frame and the disk saw to rotate the disk saw relative to the frame, the motor positioned within the motor housing, a harvesting arm attached pivotally to the frame to pivot relative thereto to gather a felled tree, a harvesting cylinder attached to the frame and the harvesting arm to pivot the harvesting arm relative to the frame, a bunching arm attached pivotally to the frame to pivot relative thereto to hold the felled tree against the horn section, and a bunching cylinder attached to the frame and the bunching arm to pivot the bunching arm relative to the frame, the harvesting cylinder or the bunching cylinder positioned above the motor housing relative to the vertical dimension, a hydraulic line routed through an interior region of the first mounting post and an interior region of the horn section to the harvesting or bunching cylinder, wherein both the harvesting cylinder and the bunching cylinder are positioned above the motor housing relative to the vertical dimension, the hydraulic line is a first hydraulic line, the first hydraulic line is routed through the interior region of the first mounting post and the interior region of the horn section to the harvesting cylinder, further comprising a second hydraulic line routed through an interior region of the second mounting post and the interior region of the horn section to the bunching cylinder.

7. The disk saw felling head of claim 6, wherein the horn section comprises a housing and a horn, the housing is mounted atop the first mounting post and the second mounting post relative to the vertical dimension, and the horn is mounted atop the housing relative to the vertical dimension, the housing comprises the interior region of the horn section through which the first hydraulic line and the second hydraulic line is routed.

8. The disk saw felling head of claim 7, wherein the first mounting post and the housing cooperate to provide a first aperture between the interior region of the first mounting post and the interior region of the housing, the second mounting post and the housing cooperate to provide a second aperture between the interior region of the second mounting post and the interior region of the housing, the housing comprises a third aperture and a fourth aperture, the third aperture and the fourth aperture are positioned laterally between the first and second mounting posts relative to the lateral dimension and are positioned at an exterior of the horn section, the first hydraulic line is routed through the first and third apertures, and the second hydraulic line is routed through the second and fourth apertures.

9. The disk saw felling head of claim 8, wherein the interior region of the housing comprises a first compartment comprising the third aperture and a second compartment comprising the fourth aperture, the first hydraulic line is routed through the first compartment, and the second hydraulic line is routed through the second compartment.

10. The disk saw felling head of claim 8, wherein the housing comprises an external wall at a bottom of the housing relative to the vertical dimension, and the external wall comprises the third aperture and the fourth aperture.

11. The disk saw felling head of claim 10, wherein the bottom wall is horizontal relative to the vertical dimension such that a normal to the third aperture and a normal to the fourth aperture are vertical relative to the vertical dimension.

12. The disk saw felling head of claim 8, wherein a normal to the first aperture, a normal to the second aperture, a normal to the third aperture, and a normal to the fourth aperture are vertical relative to the vertical dimension, the first hydraulic line is routed along a first routing path, the second hydraulic line is routed along a second routing path, the housing comprises a first bulkhead that is positioned between the first aperture and the third aperture along the first routing path and through which the first hydraulic line is routed and a second bulkhead that is positioned between the second aperture and the fourth aperture along the second routing path and through which the second hydraulic line is routed.

13. The disk saw felling head of claim 12, further comprising a third hydraulic line and a fourth hydraulic line, the third hydraulic line is routed through the interior region of the first mounting post, the first aperture, the first bulkhead, and the third aperture to the bunching cylinder, and the fourth hydraulic line is routed through the interior region of the second mounting post, the second aperture, the second bulkhead, and the fourth aperture to the harvesting cylinder.

14. The disk saw felling head of claim 6, further comprising a third hydraulic line and a fourth hydraulic line, the third hydraulic line is routed through the interior region of the first mounting post and the interior region of the horn section to the bunching cylinder, and the fourth hydraulic line is routed through the interior region of the second mounting post and the interior region of the horn section to the harvesting cylinder.

15. The disk saw felling head of claim 1, wherein the second mounting post and the housing cooperate to provide a third aperture between the interior region of the second mounting post and the interior region of the housing, the housing comprises a fourth aperture, the fourth aperture positioned between the first and second mounting posts.

16. The disk saw felling head of claim 15, wherein the hydraulic line comprises a first hydraulic line and a second hydraulic line and the first hydraulic line is routed through the first and third apertures, and the second hydraulic line is routed through the second and fourth apertures.

17. The disk saw felling head of claim 16, further comprising a first bulkhead operatively connected to the first hydraulic line and a second bulkhead operatively connected to the second hydraulic line, wherein the first bulkhead and the second bulkhead are located in the interior region of the housing.

18. The disk saw felling head of claim 17, wherein the first mounting post and second mounting post each respectively include a first mounting post aperture and a second mounting post aperture each being positioned below the harvesting cylinder and the bunching cylinder, wherein the first hydraulic line is routed through one of the first and second mounting post apertures and the second hydraulic line is routed through the other of the first and second mounting post apertures.

* * * * *